Patented Nov. 10, 1953

2,658,817

UNITED STATES PATENT OFFICE 2,658,817

CORROSION INHIBITOR

Arthur E. Martin, Concord, Calif., and Joseph W. Eberman, Houston, Tex., assignors to Shell Development Company, San Francisco, Calif., a corporation of Delaware No Drawing. Application April 10, 1950, Serial No. 155,118

7 Claims. (Cl. 23—204)

This invention relates to a treatment of waters whereby their corrosive action on metal surfaces is reduced by the addition of minor amounts of a novel composition of the type obtained on the reaction of starch with chromium trioxide.

In the operation of cooling units, washers and humidifiers of one type and another wherein water is circulated through the apparatus in contact with metal surfaces, considerable difficulty is experienced due to the rusting and corrosion of these surfaces by the water, the condition being particularly acute as the solids content of the water is gradually built up as a result of evaporation losses and the attendant addition of make-up water. The metal surfaces can be protected in large part by the addition to the water of a corrosion inhibitor, though in many cases the concentration of inhibitor required becomes so large as itself to occasion a serious problem when it comes to disposing of the waste water from the unit. This is particularly true with inorganic inhibitors such as sodium dichromate. Other types of inhibitors are frequently unattractive because of excessive cost.

It is therefore an object of this invention to provide an efficient and economical method for inhibiting the corrosive attack which is made by waters on metal surfaces, particularly those in cooling units and other heat-exchange apparatus. A further object is to provide an inexpensive composition which, on being added to the water in but relatively small amounts, has the effect of inhibiting the natural tendency of the water to corrode adjacent metal surfaces, even under those conditions wherein the solids content of the water becomes abnormally high. Still another object is to provide a treated water of this character which may be readily disposed of without after-treatment. The nature of other objects of the invention will be apparent from a consideration of the descriptive portion to follow.

It is our discovery that the foregoing objects are attained by adding to the water a minor amount of a composition formed by reacting starch with a hexavalent chromium oxygen compound. Waters which have been so treated, and which would otherwise exert a corrosive action on ferrous and other metal surfaces, exhibit a remarkable freedom from corrosive attack even under those conditions wherein the solids content of the water is greatly increased. This result was quite unexpected since the art, as exemplified by the U. S. Patent No. 2,223,771, to Uhl, for example, teaches that starch reduces the effectiveness of chromium oxygen compounds as corrosion inhibitors.

The corrosion inhibitors of the present invention are formed by reacting an aqueous solution of starch, which may be obtained from any convenient vegetable source, as corn, potatoes and the various other cereals or tubers, with a hexavalent chromium oxygen compound. The latter reactant is preferably chromium trioxide ($CrO_3$) or a solution of chromium trioxide in water (chromic acid), though good results have also been obtained by the use of various chromate and dichromate salts, such as those of the alkali metals, for example.

In the preferred practice of the invention, a solution of starch in water is first prepared and to this solution is added the desired amount of chromium trioxide, the latter compound also being added in the form of an aqueous solution if desired. Thus, when an aqueous solution of chromium trioxide, heated to a temperature of from about 50 to 100° C., is slowly added to an aqueous solution of starch which is also heated to about this same temperature, the reaction is normally complete in from about 10 to 60 minutes, though somewhat longer, or even shorter heating periods can be employed without harmful results. At room temperatures, on the other hand, reaction periods of several hours duration will usually be necessary.

In forming the inhibitor of the present invention, there should be employed from about 2 to 5 parts of starch for each part of hexavalent chromium oxygen compound [expressed as chromium trioxide ($CrO_3$)], and preferably from about 3 to 4 parts of the starch for each part of chromium trioxide. As long as these reactant proportions are observed, the concentration of starch or chromium-containing compound in the aqueous reactant solution may be varied within wide limits. Thus, good results are obtained with solutions containing from 1 to 20% of starch in addition to the requisite amount of the chromium trioxide, the upper limit on the reactant concentration being largely determined by the solubility of the starch in the solution.

The corrosion inhibiting compositions prepared in the manner described above may be added to the water under treatment in any convenient form. Thus, the aqueous reaction mixture can be added to the water either directly or in the form of a concentrate, and in some instances, particularly when the inhibitor solution is evaporated in vacuo, it is possible to obtain the product in the form of a powder. In the event that the composition is retained in the solution form, and is to be stored for any appreciable length of time, improved results are obtained by making the solution basic, since the tendency of the hexavalent chromium therein to revert to the tri-valent form is thereby minimized.

The inhibitor composition of the present invention is capable of inhibiting rusting and corrosion of ferrous and other metal surfaces by conventional cooling waters when the concentration thereof in the water, expressed in terms of the chromium content, is maintained at a level equivalent to at least 1 p. p. m., though a preferred concentration range is from 3 to 15 p. p. m. of chromium. Waters containing such relatively small amounts of chromium as this present no serious safety hazard and may readily be disposed of without reduction of the chromium or other after-treatment. This situation is to be contrasted with that prevailing when the conventional sodium dichromate stabilizers are used for here effective results are obtained only as the chromium content of the water is at least 25 p. p. m. and preferably exceeds 100 p. p. m. Waters containing as much chromium as this are exceedingly difficult to handle and frequently require extensive after-treatment before being discharged as waste.

The following examples are illustrative of the invention:

Example I

An aqueous solution containing 70 grams of soluble corn starch per liter was heated on a steam bath to 75° C., and to this solution was slowly added, over a period of 30 minutes, a like volume of an aqueous solution of chromium trioxide (20 grams $CrO_3$ per liter). The resulting solution was then cooled and made basic to Brom. Phenol Blue by addition of dilute caustic.

The efficacy of the product as a corrosion inhibitor was then determined by adding a portion of the aqueous reaction mixture to a water which was circulated for a period of 8 days through a steam-jacketed steel pipe acting as a heat exchanger. More specifically, the cooling water was one having an initial chloride concentration of 120 p. p. m. and the amount of inhibitor solution added thereto was sufficient to provide an initial hexavalent chromium concentration of approximately 3.3 p. p. m. The treated water was circulated at the rate of 3.2 liters per minute through a 38" section of ¼" (I. D.) steel pipe extending through the steam jacket, the water entering the pipe at 90° F. and being discharged therefrom to an atmospheric cooling tower at approximately 127° F. Before being recycled through the pipe, a portion of the water was continuously withdrawn as blowdown, with additional quantities of make-up water (containing 120 p. p. m. of chlorine and an amount of the inhibitor solution equivalent to from about 2-4 p. p. m. of chromium) being added to compensate for that lost through evaporation and as blowdown. At the end of the first day the chromium concentration was 5.6 p. p. m. and during the remainder of the test the concentration thereof ranged from 4.9 to 9 p. p. m. The chloride content of the water ranged from 205 to 510 p. p. m. It should also be noted that the formation of scale in the system was controlled by maintaining 3 to 5 p. p. m. of sodium hexametaphosphate in the cooling water and adjusting its pH to 8.0-8.2 with concentrated sulfuric acid. At the expiration of the 8-day test period, the unit was shut down and the steel pipe removed and split down the middle to permit inspection. It was found that the starch-$CrO_3$ reaction product had afforded good protection against corrosion along the entire length of the pipe. The first 28 inches of the pipe from its inlet end were particularly free of corrosive attack and there was only mild corrosion over the last 10 inches of the pipe.

In a succeeding operation conducted under the same conditions as those described in the foregoing paragraph, but without the addition of any starch-$CrO_3$ inhibitor, the steel pipe was found to be deeply pitted along its entire length at the end of the test.

Example II

In this operation the starch-$CrO_3$ inhibitor was prepared in the same manner as described above in Example I except that here the solution was kept on a steam bath for about an hour following the addition of the chromium trioxide, and the solution was not made alkaline by the addition of caustic.

A number of operations were then conducted wherein small steel strips of approximately the same size and weight were immersed for 7 days in a tap water which had been evaporated to about ¼ of its original volume, and wherein the pH had been adjusted to between 7.5 and 8, air being bubbled through the water during the entire test period. In the case of one operation, the water was supplied with an amount of the starch-$CrO_3$ solution sufficient to furnish a hexavalent chromium concentration of 5.1 p. p. m. At the end of the 7-day test period, the steel sample in this solution was found to have suffered a weight loss of but 0.035 gram. The loss was still only 0.065 gram when the amount of starch-chromic oxide inhibitor was so reduced as to provide but 1.7 p. p. m. of chromium in the water. When no inhibitor was added to the water, the weight loss experienced by the steel strip was 0.2 gram. In two other operations wherein the starch-chromium trioxide inhibitor was replaced, in the one case, by an amount of sodium dichromate equivalent to 30 p. p. m. of chromium, and, in the other, by 150 p. p. m. of sodium nitrite, the steel strips had weight losses of 0.041 and 0.12 gram, respectively.

The invention claimed is:

1. The method of preparing a corrosion inhibitor, said method comprising heating at a temperature between about 50° C. and about 100° C. an aqueous solution containing starch and chromic acid, in the proportion of from 2 to 5 parts of starch for each part of chromic acid, the latter calculated in terms of chromium trioxide.

2. A composition to be added to water for inhibiting corrosion of metal surfaces thereby, said composition consisting of the mixture of reaction products obtained by heating at a temperature between about 50° C. and about 100° C. a reaction mixture containing chromic acid, one part, soluble starch two to five parts, and water in an amount at least sufficient to dissolve said ingredients and their reaction products.

3. The method of inhibiting the corrosion of metal surfaces by water which comprises adding to the water a corrosion inhibitor prepared by heating at a temperature between about 50° C. and about 100° C. an aqueous solution containing from two to five parts starch, together with one part of an acidic hexavalent chromium oxygen compound, calculated in terms of chromium trioxide, said inhibitor being present in the water in an amount sufficient to provide a chromium concentration of at leaset one part per million parts of water.

4. The method for inhibiting the corrosion of metal surfaces by water which comprises adding to the water an aqueous solution of the reaction product prepared by heating at a temperature between about 50° C. and about 100° C. an aqueous solution containing from two to five parts starch together with one part of chromic acid, calculated in terms of chromium trioxide, said reaction product being present in an amount sufficient to maintain a chromium concentration in the water of between one and fifteen parts per million parts of water.

5. The method of preparing a corrosion inhibitor, said method comprising heating at a temperature between about 50° C. and about 100° C. an aqueous solution containing starch and an acidic hexavalent chromium oxygen compound in the proportion of from two to five parts of starch for each part of the chromium compound, the latter calculated in terms of chromium trioxide.

6. The product produced by the method of claim 5.

7. The method of preparing a corrosion inhibitor, said method comprising heating at a temperature between about 50° C. and about 100° C. an aqueous solution containing soluble starch and an acidic hexavalent chromium oxygen compound in the proportion of from three to four parts of starch for each part of the chromium compound, the latter being calculated in terms of chromium trioxide.

ARTHUR E. MARTIN.
JOSEPH W. EBERMAN.

References Cited in the file of this patent

UNITED STATES PATENTS

| Number | Name | Date |
|---|---|---|
| 1,162,210 | Beckers et al. | Nov. 30, 1935 |
| 2,359,858 | Iler | Oct. 10, 1944 |
| 2,412,633 | Schwartz | Dec. 17, 1946 |

OTHER REFERENCES

Haering: Film Inhibitors in Industrial Aqueous Systems, Ind. and Eng. Chem., vol. 30, No. 12, December 1938, pp. 1356–1361.

Brenner et al.: Chromated Protein Films for the Protection of Metals, Jour. of the Electrochemic Soc., vol. 93, No. 3, March 1948, pp. 55–62.

Pigment: Carbohydrate Chemistry (1948), pp. 97, 598.